April 28, 1959  R. D. COOKSLEY  2,884,223
FLOW REGULATOR
Filed April 17, 1957

INVENTOR.
RALPH D. COOKSLEY
BY
Woodhams, Blanchard & Flynn
ATTORNEYS

2,884,223
FLOW REGULATOR

Ralph D. Cooksley, Kalamazoo, Mich., assignor to General Gas Light Company, Kalamazoo, Mich., a corporation of Michigan Application April 17, 1957, Serial No. 653,426

2 Claims. (Cl. 251—274)

This invention relates to a valve structure and particularly to a ball-type valve readily adjustable for effecting a precisely controllable flow (including no flow) in one direction or permitting unrestricted flow in both directions.

It is well known that in certain types of pressure fluid circuits, it is often necessary to control accurately the flow of fluid through a conduit in one direction while permitting said fluid to flow unrestricted in the other direction. Some valves of the check-valve type have in the past been suggested for this purpose, for the problem is an old one, but they have all been either undesirably complicated, hence costly, or they have not provided sufficient precision in operation. Other disadvantages inherent in the available structures have been of such character as to limit severely the functioning of the valve and thereby to limit equally severely the effectiveness of the system of which the valve was a part.

Particularly, many flow-control devices rely upon an orifice of fixed size in any given operating adjustment, such as a fixed orifice and a needle relatively movable with respect thereto. These devices permit the accumulation of grease and dirt in such orifice, and this results in loss of accurate control over the pressure and over the flow characteristics of the fluid passing through the device. Further, such devices normally have to be disassembled to be cleaned and, after reassembling, they need to be reset; all of which is time-consuming and normally requires the shutdown of the system being controlled during such disassembling, cleaning, reassembling and resetting.

In addition, conventional flow regulating devices normally have no function whatsoever as check valves, and a product of wider sales potential is obtained if the flow regulator is also capable of functioning as a check valve.

Accordingly, the objects of the invention are as follows:

(1) To provide a two-way valve structure through which fluid flow in one direction is unrestricted and in the other direction is regulated at a desired value, which would include zero, and wherein the valve structure is characterized by extreme simplicity.

(2) To provide a valve structure, as aforesaid, which will be self-cleaning in such a manner that it will entrain solid material in the fluid, so that such solid matter will not remain on the valve seat and thereby interfere with the closing of the valve.

(3) To provide a valve structure, as aforesaid, in which the internal structure thereof moves in response to the flow of fluid therethrough in such a manner as to effect a scrubbing and dirt-removing operation thereon, in order that accumulation of grease and dirt in the valve parts will be prevented and the setting of the valve will remain accurate.

(4) To provide a valve structure, as aforesaid, in which the area available for fluid flow through the valve structure in the unrestricted direction is at least equal to the area available for fluid flow in the conduit controlled by the valve so that the valve structure itself provides no restriction to the freedom of flow of the fluid in the unrestricted direction.

(5) To provide a valve structure, as aforesaid, in which the valve will, when moved in its flow restricting direction, always assume a predetermined position with respect to the valve seat and will do so with a high degree of accuracy, whereby when said valve is adjusted for complete closure in said flow restricting direction, the closure will be effected promptly and effectively. When the valve is adjusted for only partial closure in said flow restricting direction, the flow through the restriction will remain constant to a high degree of accuracy both for continuous and intermittent operations of the valve.

(6) To provide a valve structure, as aforesaid, wherein the valve may be readily adjusted to a partially open flow-restricting position from its flow preventing position without the necessity of removing or even diminishing the fluid pressure in the conduit being controlled by said valve.

(7) To provide a valve structure, as aforesaid, which includes means for positively unseating the flow obstructing element, which means are readily operable by simple tools such as a screw driver.

(8) To provide a valve structure, as aforesaid, in which the flow adjusting device is arranged in such a manner that regardless of the adjusted position thereof it cannot be displaced from its proper operating position by the pressure within the fluid pressure system.

(9) To provide a valve structure, as aforesaid, wherein the pressure fluid passageway may be in a straight line, thereby keeping turbulence and the resultant pressures losses through said valve structure to a minimum.

(10) To provide a valve structure, as aforesaid, wherein the device for adjusting the restricting position of the ball-type valve is so arranged that it urges said ball to rotate with respect to its seat during the unseating thereof.

(11) To provide a valve structure, as aforesaid, capable of being manufactured at an extremely low cost and capable of being maintained in accurate and effective operating condition at an extremely low cost.

(12) To provide a valve structure, as aforesaid, which can readily be made from a variety of materials as required to handle whatever fluids are within the fluid system being controlled.

(13) To provide a valve structure, as aforesaid, which will remain within a predetermined setting, regardless of variations of pressure in the fluid being handled within the operative limits of the valve.

(14) To provide a valve structure, as aforesaid, which will remain at a predetermined setting, regardless of variations in temperature of the fluid being handled within the operative limits of the valve.

Other objects and purposes of the invention will be apparent to persons acquainted with devices of this general type upon a reading of the following specification and inspection of the accompanying drawing.

GENERAL DESCRIPTION

In general, the valve structure to which this invention relates has a passageway therethrough, part of which is enlarged to provide a ball-receiving chamber. A ball is disposed within said chamber; a valve seat is located at one end of said chamber and a relatively small pin at the other end of said chamber. The ball is capable of seating on said seat to prevent flow of fluid from said chamber past said seat and into said passageway. The pin is of such size with respect to the diameter of the chamber that it will limit the movement of said ball in a direction away from said seat. Said chamber itself is sufficiently large that the area available for flow of fluid around said ball will be at least as great as the area available for flow of fluid through the valve seat and passageway. A valve actuator or adjusting device is arranged for movement radially with respect to the said chamber and for bearing against the ball, whereby radially outward movement of said actuator will permit said ball to seat itself solidly against the valve seat and radially inward movement of said actuator will urge it against said ball and move it a predeterminable distance off of and away from said valve seat.

Figure 1:
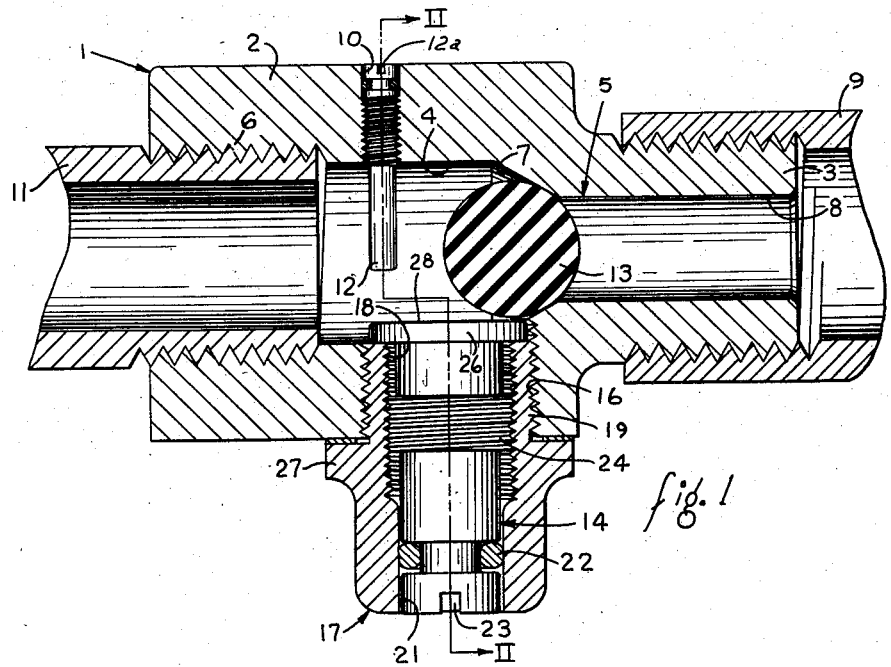
Figure 1 represents a central longitudinal section of a valve embodying the invention.

The terms "leftward" and "rightward," as used herein, will have reference to the valve structure of the invention as appearing in Figure 1. The terms "inner," "outer" and derivatives thereof will have reference to the geometric center of the valve structure and parts thereof.

*Detailed description*

While the invention can be expressed by a variety of different specific devices, one preferred embodiment is shown in the drawing and will be sufficient to illustrate the principles of the invention. Likewise, while certain materials will be mentioned throughout the following description to illustrate certain desirable features of the construction, it will be similarly recognized that these are illustrative only and that the valve may be constructed of whatever materials are appropriate for a given service.

Referring now to the drawings, the valve housing 1 has an enlarged body portion 2, a smaller nipple portion 3 and a straight passageway 5 through both. A chamber 4, which may be an enlargement of said passageway 5, is provided within the body portion 2. Said chamber 4 has an internally threaded portion 6 which extends through the end of said housing 1 opposite the nipple 3. Said chamber 4 is connected by a conic valve seat 7 to a smaller portion 8 of said passageway 5 which extends from said valve seat through the nipple portion 3. For reasons appearing later, the cross-sectional area of the chamber 4 is at least slightly more than twice, and may often be three or four times the cross-sectional area of the portion 8.

Said nipple portion 3 is externally threaded. The valve housing 1 may be connected into a suitable pressure fluid system by engaging said nipple 3 with an internally threaded pipe 9 and by placing an externally threaded pipe 11 into the portion 6 of said chamber 4. The housing structure thus far described is conveniently made of metal, such as brass, or any other material capable of withstanding corrosion from the fluid being handled within the system.

Into the valve chamber 4 there extends a pin 12 arranged substantially radially of said chamber and received into a suitable opening 10 through the side of the valve housing. The pin 12 may be fastened into the housing 2 in any convenient manner, such as by threading same into said housing, providing a suitable O-ring to prevent leakage and providing a tool-receiving slot 12a. By this construction, the distance the pin 12 extends into the chamber 4 may be adjusted, as desired, for purposes appearing hereinafter. A ball 13, made of any slightly resilient material, such as polytetrafluoroethylene, is provided within said chamber 4 for seating against the valve seat 7 and closing that portion of the passageway 5 therethrough.

Figure 2:
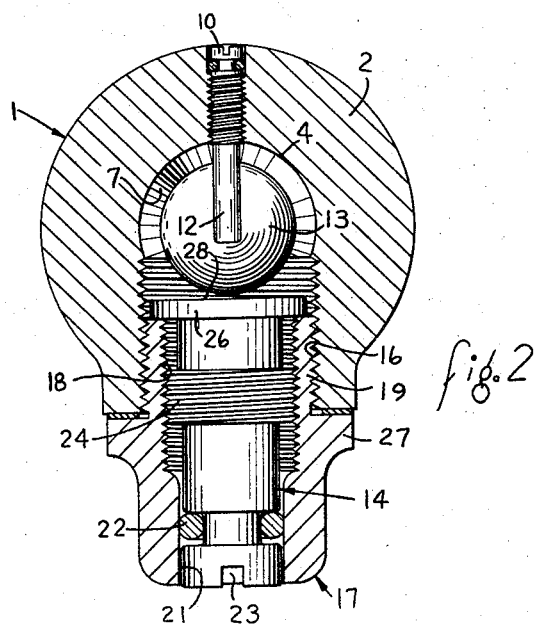
Figure 2 is a section taken on the line II—II of Figure 1.

As best shown in Figure 2, the location and diameter of the pin 12 is such with respect to the diameter of the chamber 4 that the ball 13 cannot pass beyond said pin regardless of its position within said chamber. However, with the cross-sectional areas of the chamber 4 and passageway portion 8 being as above indicated, in any position of the ball within the chamber 4, the cross-sectional area around said ball available for the flow of liquid past said ball will be at least equal to the cross-sectional area of the passageway 8 through the nipple 3. Thus, the flow of fluid in a direction to unseat the ball 13, which is leftward as appearing in Figure 1, will be entirely unrestricted by the valve structure inasmuch as the cross-sectional area available for passage of fluid therethrough is at all times at least equal to the area of the passageway 8.

A threaded opening 16 is arranged through the sidewall of the valve body 2 at a point thereon circumferentially spaced from the positioning of the pin 12. An actuator housing 17 is provided having an internally threaded actuator opening 18 and an externally threaded extension 19, said extension being threadedly received into the opening 16. The actuator opening 18 is internally threaded for a portion of its distance as shown and is provided with a smooth bore 21 through its outer portion as shown.

A generally cylindrical actuator 14 has, intermediate its ends, an enlarged threaded portion 24 threadedly receivable into the threaded portion 18 of said actuator opening. Said actuator also has a groove near its outer end receiving an O-ring 22 for bearing against the smooth portion 21 of the actuator opening and sealing it against the leakage of liquid from within said valve through said opening 18. Suitable means, such as a screwdriver slot 23, is provided at the extreme outer end of said actuator for engaging same with a suitable tool for adjustment purposes. The diameter of the actuator is such through most of its length that there is ample clearance between the external surface and the internal walls of the actuator opening 18. Extreme inner end of said actuator is provided with a flange 26 extending radially with respect to the actuator a distance sufficient to overlap the ends of the actuator housing extension 19. Intermediate flange structure 27 is arranged on the actuator housing to engage the external periphery of the valve body 2 and limit the radially inward extent of the actuator housing with respect to the valve body.

Said actuator 14 is preferably positioned with respect to the valve seat 7 so that the ball 13, when fully seated, will be engageable by the inner surface 28 of the flange 26 at a point of said flange spaced from the axis of said actuator 14, for reasons appearing more fully hereinafter. Thus, rotation of the valve actuator 14 in one direction will cause the flange 26 to engage the ball 13 and push it off the valve seat 7. Rotation of the actuator 14 in the opposite direction will permit the ball to engage the seat fully for complete blocking of the rightward flow of liquid through the valve housing 1. The flange 26 limits the distance the actuator can move in the last named direction so that there is no possibility of unintentionally backing the actuator out of the housing far enough to permit the O-ring 22 to escape from the housing, or backing it out until the O-ring leaks.

In the embodiment shown, movement of the actuator 14 into the chamber 4 is limited by the ball 13. However, if it is desirable to limit such movement of said actuator 14 at a point less than that which would be provided by the diameter of the ball, or if said ball is made of material softer than that which would provide an effective limit for said actuator, the pin 12 may be lengthened, as desired, to provide any desired limit to the movement of said actuator 14 into the chamber 4.

*Operation*

The position of the valve actuator 14, shown in the drawing, permits the valve to attain a fully closed position when flow is in the rightward direction and will, as indicated in detail above, permit an unrestricted leftward flow of the fluid through the passageway 5. However, upon suitable rotation of the valve actuator to move it inwardly, it will limit the minimum distance attainable between the ball 13 and the valve seat 7 and thereby determine the minimum flow permitted to the fluid within the passageway 5, when such flow is in a rightward direction.

As stated above, the actuator 14 is arranged so that the ball 13, when fully or partially seated, may be engaged by the inner surface of the flange 26 at a point spaced from the axis thereof. Thus, rotation of the actuator 14 as it is moved into the chamber 4 effects a rolling motion of the ball, which tends to break the ball loose from the valve seat and makes easier the opening of the valve by the actuator 14 when the system is under pressure.

It will be observed that the conic walls constituting the valve seat 7 continue divergently somewhat beyond the zone actually required to form a valve seat and blend into the walls defining the chamber 4. Thus, regardless of the position of the ball within said chamber, rightward movement of pressure fluid within said chamber will effect a prompt and efficient seating of said ball onto said valve seat and thereby effect equally prompt closure of the valve to flow of fluid rightwardly.

Further, it will be observed that the area defined by the flanged inner end of the actuator 14 is sufficiently large that it will be engageable with a ball in any position within the chamber 4 between the pin 12 and seat 7. Thus, when the actuator is in any inward position, it will be effective to hold the valve partially open for permitting an adjustably restricted flow rightwardly through the valve. Further, in this position, the inward surface of the actuator 14 will cooperate with the conic walls defining the seat 7 in such a manner that regardless of how often the fluid changes its direction of flow through the valve, the ball will always return when the fluid flows rightwardly into exactly the same position with respect to the opening through the seat 7. Thus, there will always be exactly the same fluid flow permitted through the valve regardless of the speed and frequency of changes of direction of fluid flow.

The action of the fluid flowing past the ball 13, and a limiting of leftward movement of said ball by the relatively small pin 12, will cause the ball to bounce around in the zone defined for occupation by it in such a manner that any dirt or grease, which might otherwise accumulate on the ball or on the valve seat 7, will be knocked or thrown loose and all parts of the valve, particularly the ball 13 and the valve seat 7, will remain clean. Thus, the valve will accurately hold whatever predetermined setting for a given fluid flow which might be applied to it.

While the pin 12 is shown as adjustably arranged in the housing 2, it will be recognized that it may be affixed therein in any other convenient manner, such as by pressing, which will provide a still more economical structure, with the loss of only the adjustability of the pin 12 toward the actuator 14 and thereby the adjustability of said actuator 14 into the chamber 4.

Accordingly, I have described a valve of extreme structural simplicity, one permitting entirely unrestricted flow in one direction therethrough and a closely metered flow of material in the other direction therethrough. It can be made from a variety of different materials as required to meet the different uses to which the valve may be put, and the valve can be constructed and maintained at an extreme minimum of cost.

Many variations may be made in the detailed structure of said valve from that specifically disclosed. Thus, although a particular form of valve structure have been disclosed herein for illustrative purposes, it will be understood that modifications or variations thereof which lie within the scope of the invention are fully contemplated unless specifically stated to the contrary in the appended claims.

I claim:

1. A valve structure, comprising: a valve housing having a passageway therethrough, said passageway including a first portion of enlarged cross-sectional area, a second portion of reduced cross-sectional area and a conic portion between said first and second portions and joined at its respective ends thereto and defining a valve seat therebetween; a ball disposed within said first portion and adapted to sealingly contact said valve seat, the diameter of said ball being smaller than the diameter of said first portion so that the difference in the cross-sectional areas of said ball and said first portion is at least as large as the cross-sectional area of said second portion; a stop mounted on said housing and extending radially into said enlarged portion, said stop being spaced from said valve seat a distance larger than the diameter of said ball whereby said ball may move freely within said enlarged portion between said stop and said valve seat; a flow control device threadedly mounted in and extending through a radial opening in said housing into said enlarged portion and having means threadedly mounted therein for adjustment transversely of said enlarged portion, said means having an enlarged circular head with a planar radially inner surface, said head being located within said first enlarged portion and a portion of its periphery passing transversely through a portion of said valve seat, said head being diametrically aligned with said stop whereby radially inward movement of said head may be limited by said stop.

2. A valve structure according to claim 1 wherein said flow control device includes a cylindrical sleeve having internal and external threads and having a radial flange on its external surface at the outer end of the threads thereon, the external threads of said sleeve threadedly engaging the radial opening of said valve housing with said flange lying against the external surface of said valve housing; said threadedly mounted means comprising an actuator extending through the central opening in said sleeve and having external threads thereon threadedly engaging the internal threads of said sleeve; sealing means disposed between said actuator and said sleeve outwardly of said internal threads, said enlarged head forming the inner end of said actuator and being of larger diameter than the diameter of the central opening of said sleeve and being of smaller diameter than the external diameter of said sleeve.

References Cited in the file of this patent

UNITED STATES PATENTS

| | | |
|---|---|---|
| 753,999 | Mosher | Mar. 8, 1904 |
| 777,538 | Puckett | Dec. 13, 1904 |
| 1,339,383 | Beese | May 11, 1920 |
| 1,488,008 | Jones | Mar. 25, 1924 |